United States Patent
Budik et al.

(10) Patent No.: US 10,171,517 B2
(45) Date of Patent: *Jan. 1, 2019

(54) NOTIFYING RESPONSE SENDER OF MALFORMED SESSION INITIATION PROTOCOL (SIP) RESPONSE MESSAGES

(71) Applicant: International Business Machines Corporation, Armonk, NY (US)

(72) Inventors: Asher Budik, Petach Tikva (IL); Tamir Faibish, Rishon LeZiyyon (IL); Vladimir Gamaley, Rehovot (IL); Lior Luker, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/949,103

(22) Filed: Apr. 10, 2018

(65) Prior Publication Data

US 2018/0205766 A1    Jul. 19, 2018

Related U.S. Application Data

(63) Continuation of application No. 15/666,601, filed on Aug. 2, 2017, now Pat. No. 9,973,548, which is a
(Continued)

(51) Int. Cl.
*G06F 15/16* (2006.01)
*H04L 29/06* (2006.01)

(52) U.S. Cl.
CPC ........ *H04L 65/105* (2013.01); *H04L 65/1006* (2013.01); *H04L 65/1069* (2013.01); *H04L 65/1076* (2013.01)

(58) Field of Classification Search
CPC ............. H04L 65/1076; H04L 65/1006; H04L 65/105; H04L 65/1069
See application file for complete search history.

(56) References Cited

U.S. PATENT DOCUMENTS 7,684,323 B2    3/2010    Tiainen
7,796,603 B1    9/2010    Bertone
(Continued)

FOREIGN PATENT DOCUMENTS

CN    103516723 A    1/2014
EP    1914958 A1    1/2009

OTHER PUBLICATIONS

Saint-Andre et al.; "Interworking between the Session Initiation Protocol (SIP) and the Extensible Messaging and Presence Protocol (XMPP): Architecture, Addresses, and Error Handling"; Standards Track; May 2014; pp. 1-24; <https://www.rfc-editor.org/rfc/rfc7247.txt>.

(Continued)

*Primary Examiner* — Moustafa M Meky
*Assistant Examiner* — Andrea L Hurst
(74) *Attorney, Agent, or Firm* — David B. Woycechowsky

(57) ABSTRACT

A method, computer program product, and computer system for notifying a response sender of a malformed SIP response message. The method includes, producing a special ACK message after receiving a malformed response message from a SIP server. The special ACK message contains a correction of the determined malformation, and is sent to the SIP server for correction by the SIP server.

1 Claim, 5 Drawing Sheets

Related U.S. Application Data continuation of application No. 15/133,580, filed on Apr. 20, 2016.

(56) References Cited

U.S. PATENT DOCUMENTS

| | | | |
|---|---|---|---|
| 8,010,850 B2 | 8/2011 | Kruse et al. | |
| 8,675,474 B2 | 3/2014 | Chien et al. | |
| 8,935,413 B2 | 1/2015 | Cai et al. | |
| 9,213,605 B2* | 12/2015 | Oyman | H04W 4/06 |
| 9,363,651 B1 | 6/2016 | Dacosta | |
| 9,398,498 B2* | 7/2016 | Ozgur | H04W 4/70 |
| 2006/0291412 A1* | 12/2006 | Naqvi | H04M 7/123 370/328 |
| 2008/0095143 A1 | 4/2008 | Lai | |
| 2008/0130580 A1 | 6/2008 | Chaponniere | |
| 2008/0285468 A1* | 11/2008 | Seo | H04L 63/1416 370/242 |
| 2012/0005527 A1 | 1/2012 | Engel | |
| 2013/0246846 A1* | 9/2013 | Oyman | H04W 4/06 714/18 |
| 2014/0095730 A1* | 4/2014 | Ozgur | H04W 4/70 709/231 |
| 2016/0036866 A1* | 2/2016 | Oyman | H04W 4/06 709/228 |
| 2017/0310715 A1* | 10/2017 | Budik | H04L 65/1006 |
| 2017/0331864 A1 | 11/2017 | Budik et al. | |
| 2018/0084014 A1* | 3/2018 | Mufti | H04L 65/1016 |

OTHER PUBLICATIONS

"Appendix P: List of IBM Patents or Patent Applications Treated as Related", Filed Herewith, 2 Pages.

Budik et al. "Notifying Response Sender of Malformed Session Initiation Protocol (SIP) Response Messages", U.S. Appl. No. 15/949,098, filed Apr. 10, 2018, 15 pages.

* cited by examiner

402

```
SIP/2.0 200 OK
Contact: sip
CSeq: 1 INVITE
Call-ID: 1-7440@9.148.58.152
Record-Route: <sip:USER-PS.mail.com:5060;transport=tcp;compsid=wlp_1_0;lr>
To: sut <sip:service@USER-PS.mail.com:5070>;tag=1
From: sipp <sip:sipp@9.148.58.152:16010>;tag=1
Via: SIP/2.0/TCP USERPS.mail.com:5060;rport;compsid=wlp_1_0;branch=z9hG4bK1214050665835290
Via: SIP/2.0/TCP 9.148.58.152:16010;branch=z9hG4bK-7440-1-0;received=9.148.58.152;rport=65051
Content-Length: 0
```

```
ACK sip:9.148.58.152:5070;transport=TCP SIP/2.0
Contact: sip:sipp@9.148.58.152:16010
CSeq: 1 ACK
Max-Forwards: 70
Call-ID: 1-7440@9.148.58.152
Route: <sip:USER-PS.mail.com:5060;transport=tcp;compsid=wlp_1_0;lr>
To: sut <sip:service@USER-PS.mail.com:5070>;tag=1
From: sipp <sip:sipp@9.148.58.152:16010>;tag=1
Via: SIP/2.0/TCP 9.148.58.152:16010;branch=z9hG4bK-7440-1-4
Error-In-Response: 402 Bad Contact
Content-Length: 1000
SIP/2.0 200 OK
Contact: sip
CSeq: 1 INVITE
Call-ID: 1-7440@9.148.58.152
Record-Route: <sip:USER-PS.mail.com:5060;transport=tcp;compsid=wlp_1_0;lr>
To: sut <sip:service@USER-PS.mail.com:5070>;tag=1
From: sipp <sip:sipp@9.148.58.152:16010>;tag=1
Via: SIP/2.0/TCP USER-PS.mail.com:5060;rport;compsid=wlp_1_0;branch=z9hG4bK1214050665835290
Via: SIP/2.0/TCP 9.148.58.152:16010;branch=z9hG4bK-7440-1-0;received=9.148.58.152;rport=65051
Content-Length: 0
```

NOTIFYING RESPONSE SENDER OF MALFORMED SESSION INITIATION PROTOCOL (SIP) RESPONSE MESSAGES

BACKGROUND OF THE INVENTION

The present invention relates generally to the field of error detection and notification, and more particularly to systems and methods for notifying a response sender of malformed SIP response messages.

Session Initiation Protocol ("SIP") is a peer-to-peer, application layer signaling protocol, often used in the telecommunications industry. SIP can be used to establish, modify, and tear down IP multimedia sessions with one or more participants. A SIP has two types of agents: a user agent client (UAC) and a user agent server (UAS). Typically, a UAC initiates a negotiation by sending a request, and the UAS sends a response to the request. When the negotiation is successful, the UAC sends an ACK message, confirming that the UAC received the UAS response to the request.

SUMMARY

According to an embodiment of the present invention, a method for notification about a malformed SIP response is provided. The method comprises: in response to receiving a malformed response message at a session initiation protocol (SIP) client, from a SIP server, producing a dedicated ACK message; sending the dedicated ACK message to the SIP server, wherein the ACK message includes the malformed response message; and receiving, by the SIP server, the dedicated ACK message.

Another embodiment of the present invention provides a computer program product for notification about a malformed SIP response, based on the method described above.

Another embodiment of the present invention provides a computer system for notification about a malformed SIP response, based on the method described above.

BRIEF DESCRIPTION OF THE DRAWINGS

FIG. 4A depicts an example of a malformed response sent by a UAS, in accordance with an embodiment of the present invention;

FIG. 4B depicts an example of a special ACK message sent by a UAC, in accordance with an embodiment of the present invention.

DETAILED DESCRIPTION

Session Initiation Protocol (SIP) is a peer-to-peer, application layer signaling protocol, often used in the telco industry. SIP can be used to establish, modify, and tear down IP multimedia sessions with one or more participants. A SIP has two types of agents: a user agent client (UAC) and a user agent server (UAS). Typically, a UAC initiates a negotiation by sending a request, and the UAS sends a response to the request. When the negotiation is successful, the UAC sends an ACK message, confirming that the UAC received the UAS response to the request. When a malformed SIP request arrives at the UAS, is responds with an error message, however, when a malformed SIP response arrives at the UAC, it does not reply with an error, thus the UAS continues to retransmit the response until a timeout is reached. Embodiments of the present invention provide systems and methods for identifying a malformed response from the UAS and send a special ACK message containing the exact point of error and to keep the UAS from retransmitting the malformed message.

Figure 1:
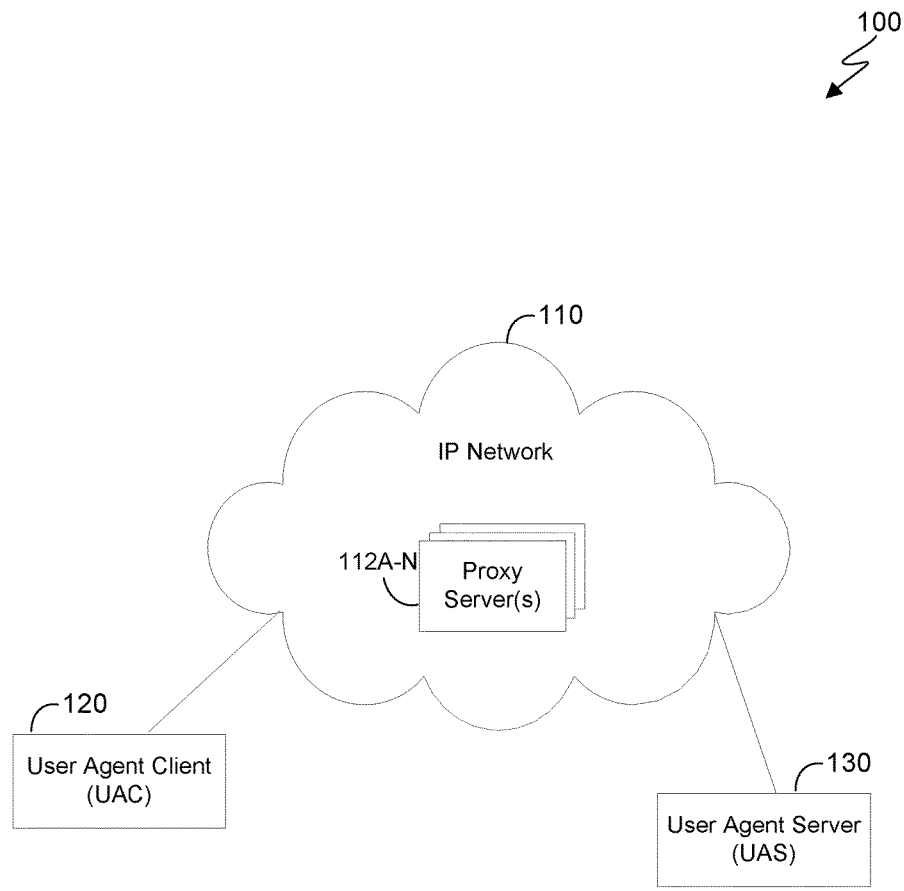
FIG. 1 depicts a functional block diagram of a SIP environment, in accordance with an embodiment of the present invention.

The present invention will now be described in detail with reference to the Figures. FIG. 1 depicts a functional block diagram illustrating a SIP environment, generally designated 100, in accordance with an embodiment of the present invention. Modifications to SIP environment 100 may be made by those skilled in the art without departing from the scope of the invention as recited by the claims. In an exemplary embodiment, SIP environment 100 includes user agent client (UAC) 120 and user agent server (UAS) 130, interconnected by IP network 110.

In this exemplary embodiment, UAC 120 and UAS 130 are different types of user agents, or logical network endpoints used to manage a SIP session in SIP environment 100. In other embodiments, there can be multiple participants (multiple UAC 120 and UAS 130) in SIP environment. UAC 120 and UAS 130 negotiate using SIP messages, which are text-based protocol, containing key/values, each having a start-line, header, and body, and are in the form of requests and responses. UAC 120 initiates negotiations by sending a SIP request and UAS 130 receives the SIP requests and sends a SIP response to UAC 120. Often, when the response sent by UAS 130 is malformed, there is a retransmission of the malformed response by UAS 130, until a timeout occurs.

IP network 110 can be, for example, a local area network (LAN), a wide area network (WAN) such as the Internet, the public switched telephone network (PSTN), a mobile data network (e.g., wireless Internet provided by a third or fourth generation of mobile phone mobile communication), a private branch exchange (PBX), any combination thereof, or any combination of connections and protocols that will support SIP communications between UAC 120 and UAS 130, in accordance with an embodiment of the present invention. IP network 110 may include wired, wireless, or fiber optic connections.

In this exemplary embodiment, IP network 110 includes proxy servers 112A-N. Proxy servers 112A-N are intermediary server components for the purpose of making requests on behalf of a client (i.e., UAC 120). Proxy servers 112A-N can make routing determinations, such as ensuring a request is sent to an entity close to the targeted user.

Figure 2:
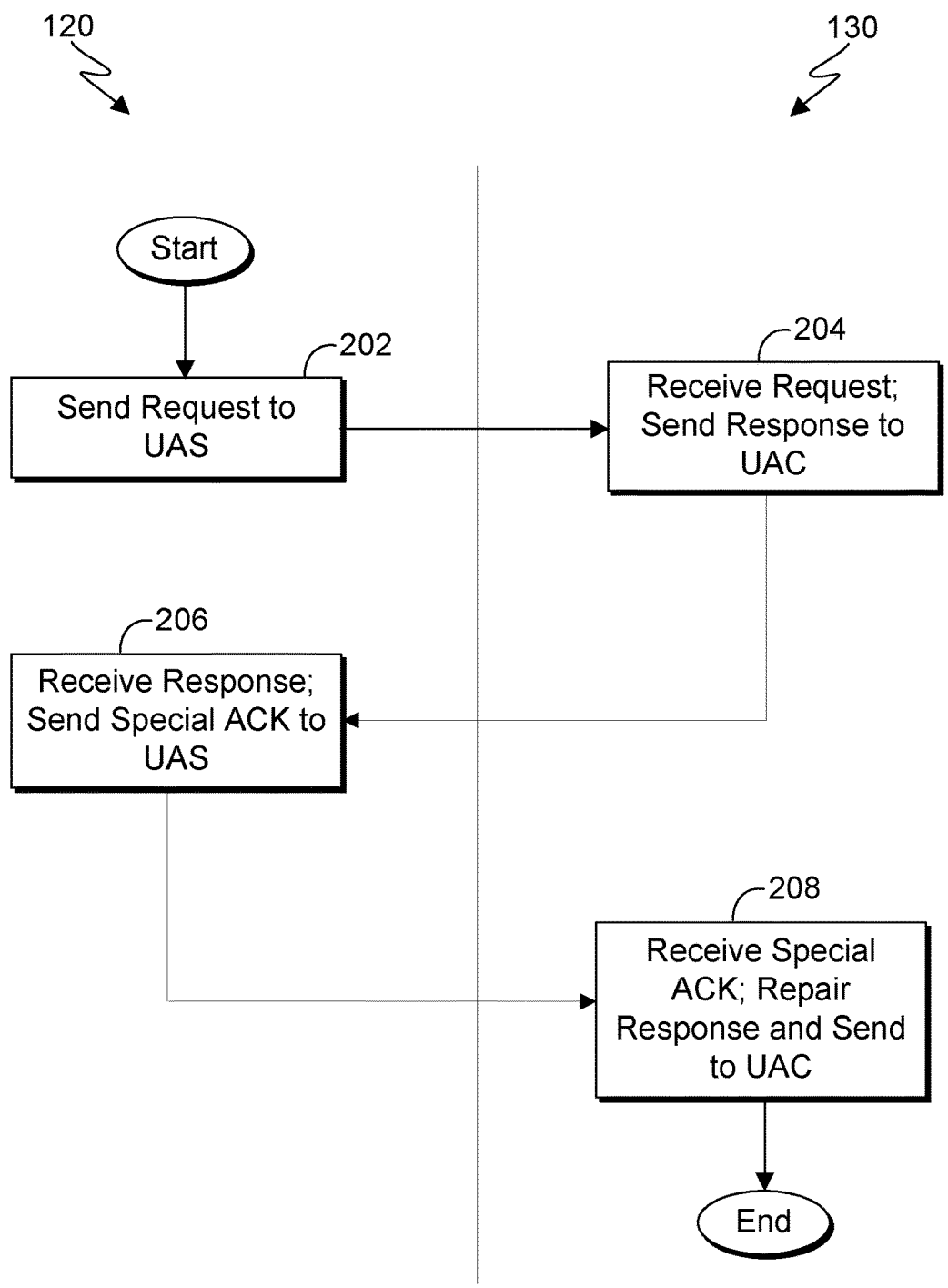
FIG. 2 depicts a flowchart illustrating operational steps of a UAC for sending a special ACK when a malformed SIP response is received from a UAS, in accordance with an embodiment of the present invention.

FIG. 2 depicts a flowchart illustrating operational steps of UAC 120 for sending a special ACK when a malformed SIP response is received from UAS 130, in accordance with an embodiment of the present invention.

In step 202, UAC 120 sends a request to UAS 130. In this exemplary embodiment, UAC 120 sends a SIP request to UAS 130 to initiate negotiations of an IP multimedia session, using methods known in the art.

In step 204, UAS 130 receives the request, and sends a response to UAC 120. In this exemplary embodiment, UAS 130 sends a response to UAC 120, in response to receiving the request. The response sent by the UAS 130 contains an indication that the message is malformed. For example, there can be a malformation in the key/values of the header of the message.

In step 206, UAC 120 receives the response and sends a special ACK to UAS 130. In this exemplary embodiment, UAC 120 does not discard a malformed response, rather UAC 120 sends a special ACK message to UAS 130, which contains the header "Error-In-Response", in which the value is the reason for the error. UAC 120 implements the logic to determine the reason for the error. In some embodiments, the special ACK has the headers of the response as a raw body, in order for UAS 130 to repair the error (discussed further in FIG. 4B).

In step 208, UAS 130 receives the special ACK and optionally repairs the response and sends the repaired response to UAC 120. In this exemplary embodiment, when UAS 130 receives the special ACK from UAC 120, which contains the header of the response as a raw body, UAS 130 can repair the issue and send the repaired response back to UAC 120 to establish the SIP session. This reduces the logic required for UAS 130 and the reliability of UAC 120, as UAC 120 can recognize the exact error in the special ACK, and include an exact header and body for UAS 130 to fix the identified error.

Accordingly, by performing the operational steps of FIG. 2, the diagnostic abilities and automatic error correction (i.e., mitigation actions) can be improved in SIP environments involving many different components, as well as improving future troubleshooting and problem analysis in SIP responses.

Figure 3A:
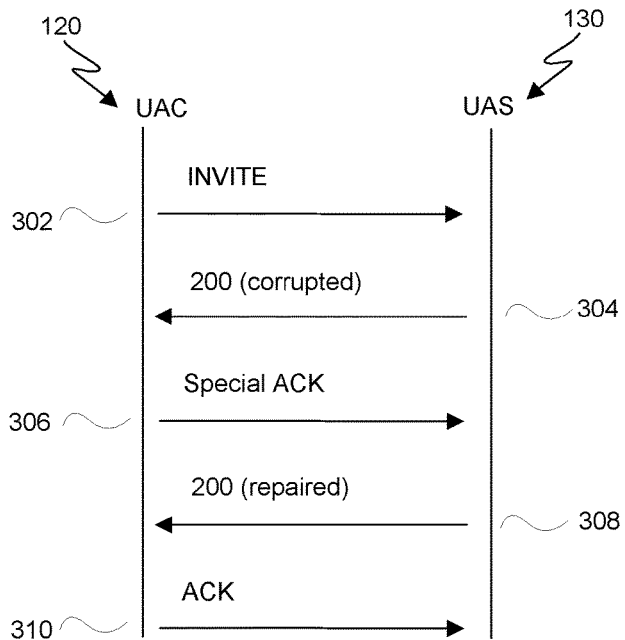
FIG. 3A depicts an example of a negotiation between a UAC and UAS using a special ACK message, in accordance with an embodiment of the present invention.

FIG. 3A depicts an example of a negotiation between a UAC and UAS using a special ACK message, in accordance with an embodiment of the present invention.

As depicted in FIG. 3A, UAC 120 sends an initial request 302 to UAS 130. In this example, UAS 130 responds with a malformed message 304. UAC 120 sends a special ACK message 306 to UAS 130, with the header as a raw body, so that UAS 130 can repair the response. UAS 130, after making the repair, sends the repaired response 308 to UAC 120. UAC 120 then sends an ACK response 310 to UAS 130, establishing the SIP session.

Figure 3B:
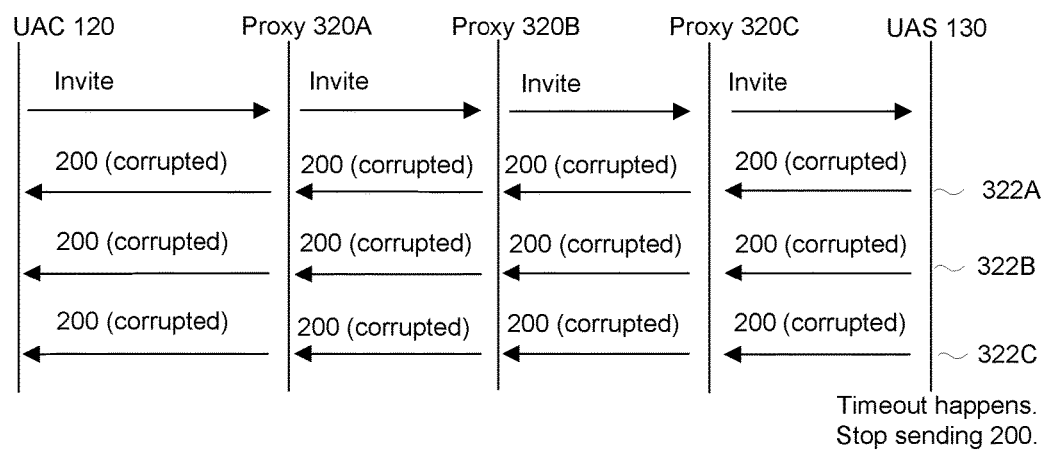
FIG. 3B depicts an example of a negotiation between a UAC and UAS with multiple proxy servers, in accordance with an embodiment of the present invention.

FIG. 3B depicts an example of a negotiation between UAC 120 and UAS 130 with multiple proxy servers, in accordance with an embodiment of the present invention.

In some embodiments of the present invention, there can be many SIP entities (e.g., 100 entities or more) between UAC 120 and UAS 130, for example, multiple proxy servers, registrar servers, etc. In the case where the response is malformed, the response is continually sent through each SIP-entity over and over again, until a timeout occurs, which may add significant network traffic to the system. As depicted in FIG. 3B, there are three proxy servers, 320A, 320B, and 320C. For each retransmission attempt 322A-C of the malformed '200' message, the message passes through each proxy server 320A-C, reducing the performance of each proxy server 320A-C. By using a special ACK, each proxy server 320A-C can handle other requests and responses at the same time, instead of putting network bandwidth toward the retransmission attempts. This may save network traffic and allow the SIP entities (e.g., proxy servers) to achieve higher performance.

FIG. 4A depicts an example of a malformed response sent by UAS 130, in accordance with an embodiment of the present invention.

As depicted in FIG. 4A, a malformed response 402 is sent by UAS 130 (i.e., step 204). In this example, the value of the 'Contact' header 404 is illegal, which is identified by UAC 120 as the malformation in the response.

FIG. 4B depicts an example of a special ACK message sent by a UAC, in accordance with an embodiment of the present invention.

As depicted in FIG. 4B, a special ACK message 406 is created and sent by UAC 120 (i.e., step 206). UAC 120 can recognize the error in the response, and sends UAS 130 the reason in Error-In-Response 408. In this example, the body 410 of the special ACK message 406 is the original malformed response 402 of FIG. 4A, so that UAS 130 can repair the error. In this manner, the logic needed by UAS 130 is reduced, as UAC 120 can point to the exact error in the response for UAS 130 to repair.

Figure 5:
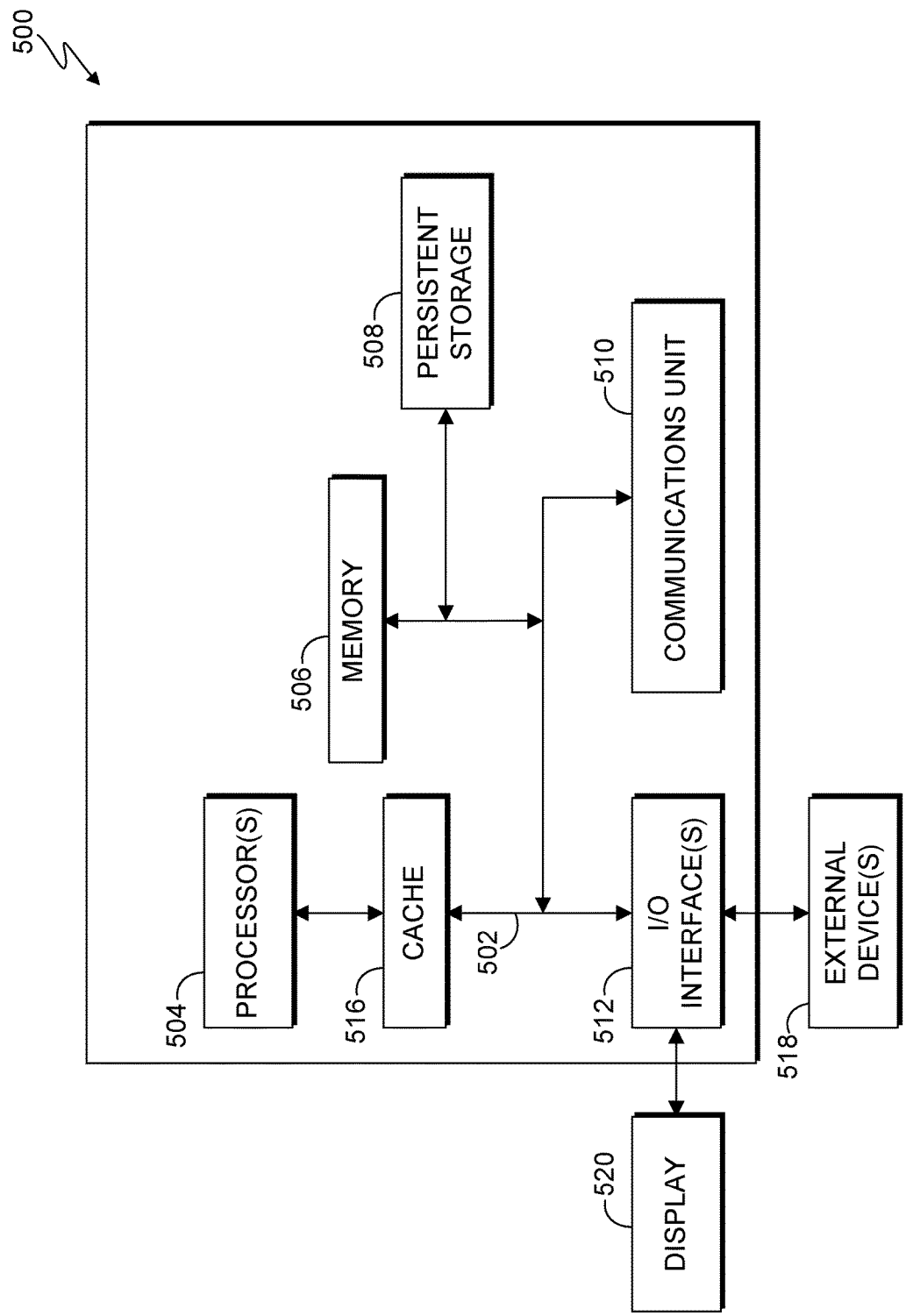
FIG. 5 depicts a block diagram of components of a computing device, in accordance with an illustrative embodiment of the present invention.

FIG. 5 depicts a block diagram of internal and external components of a computing device, generally designated 500, which is representative of components of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between computer processor(s) 504, memory 506, cache 516, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM). In general, memory 506 can include any suitable volatile or non-volatile computer readable storage media. Cache 516 is a fast memory that enhances the performance of processors 504 by holding recently accessed data, and data near recently accessed data, from memory 506.

Program instructions and data used to practice embodiments of the present invention may be stored in persistent storage 508 and in memory 506 for execution by one or more of the respective processors 504 via cache 516. In an embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices, including resources of a network. In these examples, communications unit 510 includes one or more network interface cards. Communications unit 510 may provide communications through the use of either or both physical and wireless communications links. Program instructions and data used to practice embodiments of the present invention may be downloaded to persistent storage 508 through communications unit 510.

I/O interface(s) 512 allows for input and output of data with other devices that may be connected to computing device 500. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention (e.g., software and data) can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer system for handling notification about a malformed SIP response, the computer program product, the computer system comprising:
    a processor(s) set;
    a non-transitory computer readable storage medium; and
    program instructions stored on the non-transitory computer readable storage medium, with the program instructions including computer code for causing a processor(s) set to perform at least the following operations:
        in response to program instructions to receive a malformed response message at a session initiation protocol (SIP) client, from a SIP server, producing a dedicated acknowledgment (ACK) message,
        sending the dedicated ACK message to the SIP server, wherein the dedicated ACK message includes the malformed response message and a header of the malformed response in a raw body,
        receiving, by the SIP server, the dedicated ACK message including the malformed response message,
        amending, by the SIP server, contents of the dedicated ACK message to correct the malformed response message and thereby obtain a well-formed response message that includes all of the following: an Error-In-Response header including information indicative of a reason for the malformation of the malformed response message, and headers of the malformed response message as a raw body of the well-formed response message, and
        sending, by the SIP server, the well-formed response message to the SIP client, to establish a communication,
    wherein the sending of the dedicated ACK message to the SIP server further includes passing the dedicated ACK message through a plurality of proxy servers before arriving at the SIP server.

* * * * *